Nov. 10, 1931.   L. T. FREDERICK   1,831,065
APPARATUS FOR MAKING COMPOSITE PRODUCTS
Filed June 13, 1928   2 Sheets-Sheet 1
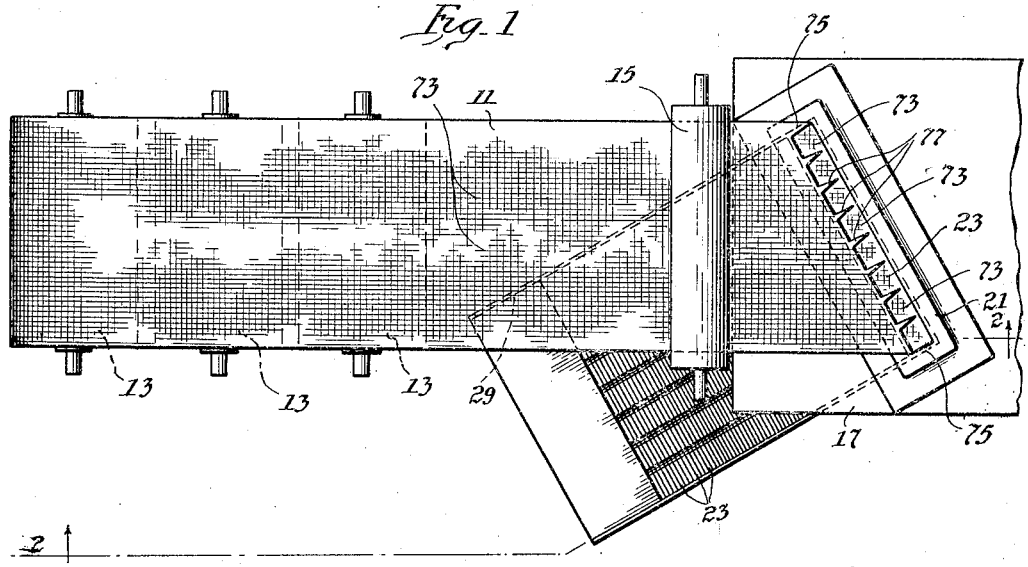
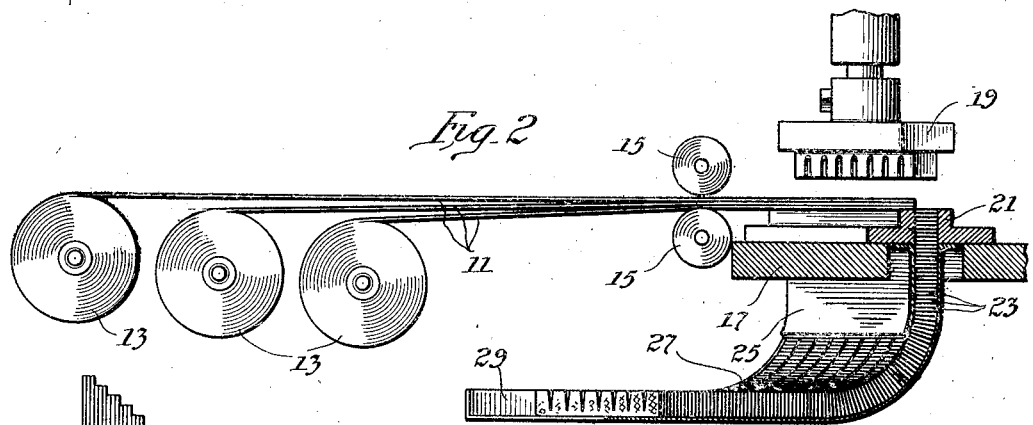
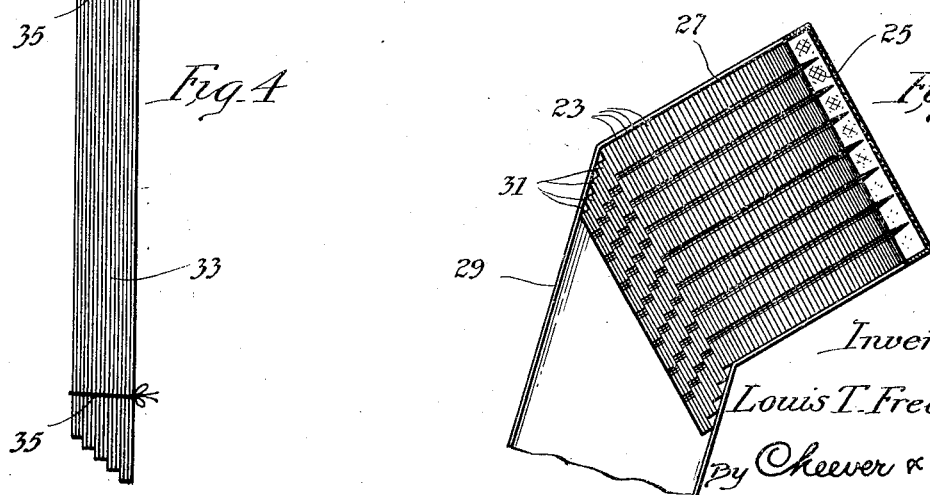
Inventor:
Louis T. Frederick
By Cheever & Cox.
Attys Nov. 10, 1931.   L. T. FREDERICK   1,831,065
APPARATUS FOR MAKING COMPOSITE PRODUCTS
Filed June 13, 1928   2 Sheets-Sheet 2
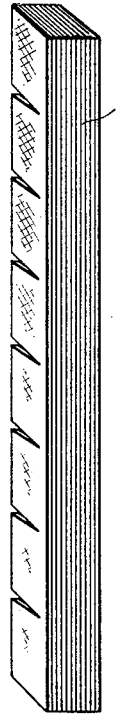
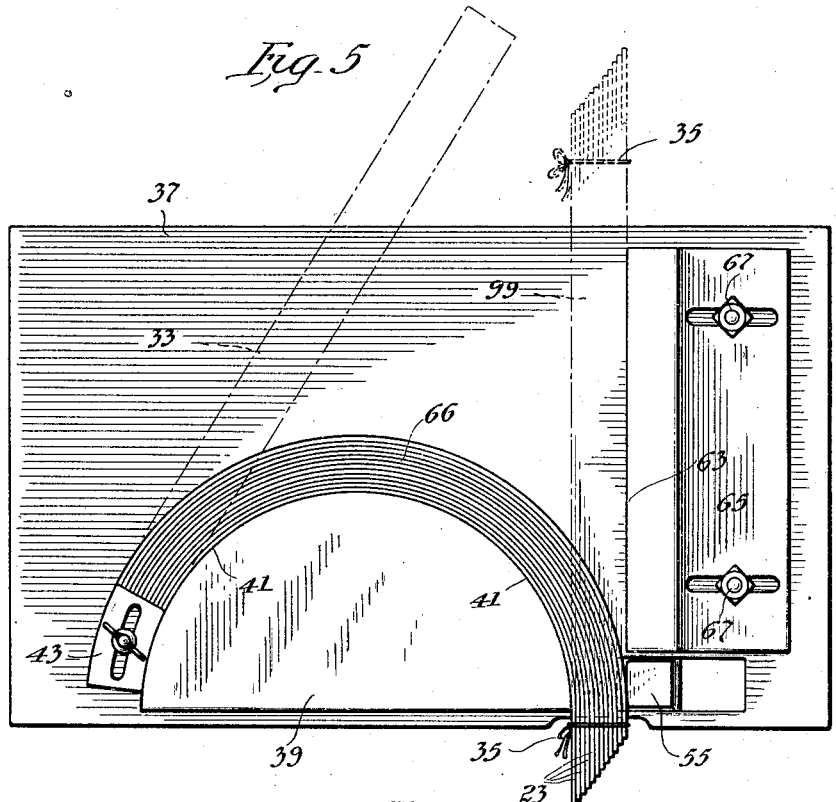
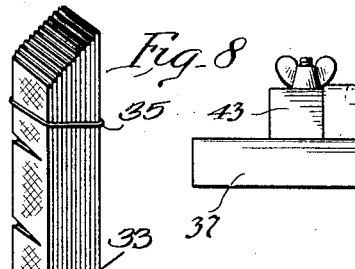
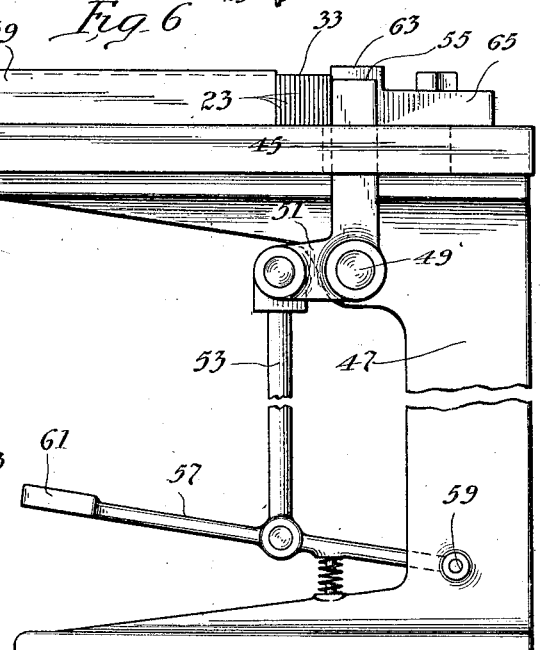
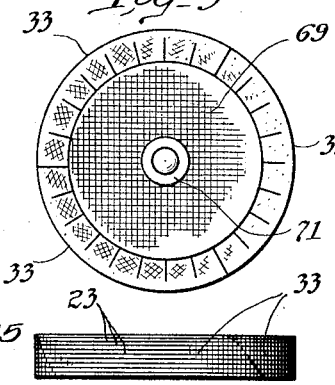
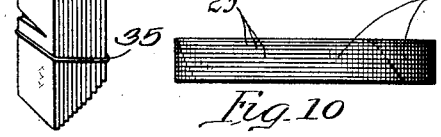
Inventor
Louis T. Frederick
By Cheever & Cox, Attys.

Patented Nov. 10, 1931

1,831,065

UNITED STATES PATENT OFFICE

LOUIS T. FREDERICK, OF VALPARAISO, INDIANA, ASSIGNOR, BY MESNE ASSIGNMENTS, TO CONTINENTAL DIAMOND FIBRE COMPANY, OF NEWARK, DELAWARE, A CORPORATION OF DELAWARE

APPARATUS FOR MAKING COMPOSITE PRODUCTS

Application filed June 13, 1928. Serial No. 284,934.

My invention relates in general to the manufacture of wheels, gear blanks and the like and has more particular reference to novel and improved methods of manufacturing composite products of the type comprising canvas or similar fabric material impregnated with a binder such as bakelite or other heat-curing material.

Products of this general nature are commonly referred to as "fiber-gears", and various methods of forming the same have been suggested, particularly with respect to the internal arrangement of the fabric material, such various arrangements being devised for the dual purpose of saving material and strengthening the product. In my prior Patents No. 1,561,222, 1,626,230 and 1,636,411, issued respectively Nov. 10, 1925, April 26, 1927 and July 19, 1927 and co-pending applications Serial No. 129,375, 174,688, 199,493, 199,494 and 221,182, filed respectively August 16, 1926, March 11, 1927, June 17, 1927, June 17, 1927 and Sept. 22, 1927, I have illustrated and described various novel and preferred ways of arranging the fabric within the structures. In each of these, the rim portions of the product is formed of laminated strips arranged about webs of various constructions.

One object of my present invention is to provide a novel and economic means and method for producing lamination strips adapted to be used in making the rims of fiber gear blanks and the like.

Another object of my present invention is to provide a means and method of cutting lamination strips from strips of stock material of standard width so as to produce lamination strips of various lengths from stock strips of standard, uniform width.

Another important object of my present invention is to provide means and method of producing fabric lamination strips in which the individual threads extend diagonally from stock material in which the threads extend normally, whereby the strength of the individual threads of the lamination strips are used to maximum advantage in the product.

In my aforesaid Patent No. 1,561,222 the web or spider of the gear blank comprises subdivided fabric scrap material impregnated with a binder and compacted under heat and pressure, which construction is valuable since it enables the utilization of low cost scrap material in the manufacture of fiber gears. My present invention allows the provision of strip laminations with a minimum of waste of the stock strip from which they are cut in such a manner that the waste or scrap portions of the stock strip may be utilized to form gear blanks of the type described in my aforesaid Patent No. 1,561,222. The method of my present invention, however, does not produce more scrap material per gear than can be utilized in making the web portion of the gear, so that in practicing my invention I am never faced with the costly necessity of disposing of excess waste material, but can use all the scrap produced in making the product.

Another important object of my present invention is to provide means for cutting strip laminations of various lengths from a stock sheet of standard width whereby the necessity of keeping on hand a number of different widths of standard stock sheets is eliminated.

In my aforesaid copending applications, Serial Nos. 129,375, 174,688 and 221,182, I have illustrated a novel means of cutting and arranging the strip laminations, the principal features of which are the removal of segments from the strip laminations whereby the same may be curved around the periphery of the web portion without buckling and the staggering or fanning of adjacent strip laminations whereby the line of severance at the ends of the laminations and the points in adjacent laminations from which the segments are removed, are staggered in the finished products. I have found that this construction provides a gear blank of great strength which is, moreover, simple to make so that gears made in accordance therewith are cheap and efficient. It is an important object of my present invention to provide novel means for making the strip laminations and fanning or staggering the same cheaply and efficiently whereby the cost of manufacturing gear blanks of this general type may be reduced to a minimum.

Still another important object of my present invention is to provide a machine for positively staggering a stack of strip laminations and securing the same in staggered relationship.

Numerous other objects and advantages of my present invention will be apparent as it is more fully understood from the following description which, taken in connection with the accompanying drawings illustrates a preferred embodiment of the invention.

Referring to the drawings:

Figure 1 is a top plan view of a strip lamination cutter embodying my invention;

Figure 2 is an elevation view of the apparatus illustrated in Figure 1, parts of which are shown in section to reveal the details of construction;

Figure 3 is a plan view of a preferred construction of the delivery chute of the lamination cutter of Figures 1 and 2 whereby the laminations may be automatically staggered as they are delivered from the cutter;

Figure 4 is an elevation view of a stack of strip laminations in staggered relationship as they emerge from the delivery chute illustrated in Figure 3;

Figure 5 is a top plan view of an improved apparatus for positively staggering the lamination strips produced by the cutter of Figures 1 and 2;

Figure 6 is an elevation view of the apparatus illustrated in Figure 5;

Figure 7 is a perspective view of a stack of strip laminations before being fanned by the staggering apparatus illustrated in Figures 5 and 6;

Figure 8 is a perspective view of a stack of strip laminations after being fanned by the staggering apparatus;

Figure 9 is a top plan view of a gear blank or the like illustrating the manner of applying the staggered strip laminations therein; and Figure 10 is an elevation of the gear blank illustrated in Figure 9.

To illustrate my invention I have shown on the drawings means for punching lamination strips from a stock strip. I prefer to introduce a plurality of stock strips simultaneously into the punch press since in this manner I am able to punch a number of lamination strips simultaneously during every stroke of the press. In the illustrated embodiment I have shown three stock strips 11 which are mounted in the form of rolls 13 of material adjacent the punch press. These strips pass between feed rollers 15 which may be driven from any convenient source of power and which press the strips together and feed them intermittently into the press. The press comprises a frame in which a support table 17 is mounted, a die 21 carried by the support table and a punch 19 suitably mounted on a vertical reciprocating plunger above the die 21. As the stock strips 11 are fed into the die 21, the punch 19 moves downwardly and strikes lamination strips 23 from the stock strips and forces them through the die and into a channel 25 which is carried by the supporting table 17. The channel 25 is rectangular in cross section and extends vertically downwardly for some distance beneath the supporting table 17 and is then curved and has a horizontally extending portion 27. After the punch press has been operating, the channel 25 becomes filled with lamination strips which are moved laterally therein each time the punch 19 strikes lamination strips from the stock strips. The outer extremity 29 of the horizontal portion 27 of the strip channel 25 is offset laterally so that the strip laminations when they enter this offset portion will be staggered in bunches 31 as illustrated in Figure 3 of the drawings. In the embodiment illustrated the laminations are staggered in bunches of three since this is the number of stock strips which are fed into the punch press. From the offset portion 29 the staggered strips may be removed by the operator and tied in bundles 33 by means of twine 35 or other suitable fastening means. These bunches are adapted to be laid up to form the rim portion of a gear blank or similar article. One advantage of staggering in bunches is that the operator may more rapidly count the number of strips to be bundled.

It will be apparent that by changing the angle at which the stock strips 11 are fed into the punch press, and by increasing or decreasing the length of the die 21 and punch 19, that I am able to punch lamination strips of any desired length from a standard stock strip, that the threads 73 of the fabric will extend diagonally of the stock strips so punched and that the scrap material produced will consist of triangular pieces 75 representing the excess of material at each end of the strip and segments 77 removed at intervals therefrom.

Staggering the stock strips in bunches is not entirely satisfactory for all purposes. It is frequently desirable to stagger each lamination uniformly, and although the device illustrated in Figure 3 of the drawings will so stagger the lamination strips produced providing a single stock strip is fed into the punch press, I have provided a device whereby the lamination strips of each bunch 33 may be positively and uniformly staggered. This device is illustrated in Figures 5 and 6 of the drawings and comprises a table 37 carrying a forming block 39 secured to its upper surface. This forming block has an edge 41 conforming to the arc of a circle and a clamping device 43 is arranged at one end of this edge. A bundle 33 of unstaggered lamination strips such as is illustrated in Figure 7 of the drawings, may be removed from the discharge chute of the punch press and arranged on the table 37 as illustrated in dotted lines in Figure 5 of the drawings, with one end clamped in the device 43. The free end of the bunch is then drawn inwardly around the forming block 39 and the bunch assumes the curved position 66 illustrated in Figure 5, the free ends of the strips being thus arranged in staggered relationship. A temporary clamping device 55 is arranged adjacent the forming block 39, and the lamination strips so staggered, in position to clampingly secure the ends of the strips in staggered relationship until an operator may place a fastening device 35, comprising, in the illustrated embodiment, a short length of cord or the like, about the staggered end of the bunch. Thereafter the unstaggered end of the bunch is released from the clamp 43 whereupon the resilience of the strips causes them to straighten. An adjustable stop 65 having a vertical surface 63 is arranged on the top of the table 37 in position such that the surface 63 may act as a guide for the bunch to limit the straightening movement of the strips 23. This stop is adjustable by means of threaded clamping members 67 which extend through elongated slots formed in the body of the stop. As the bunch assumes the straight position 99 against the guide surface 63, the unstaggered end becomes staggered as illustrated in dotted lines in Figure 5 of the drawing and the operator applies a fastening device 35 at that end also. The table 37 may be supported in any convenient manner as by the supporting pedestal 47. The temporary clamp in the illustrated embodiment comprises a bell crank pivoted at 49 to the support pedestal 47 and having a long arm 45 extending upwardly through the table 37 in position to engage the staggered end of the curved bunch of stock strips between the arm 45 and the forming block 39. The adjustable clamp is operated by a treadle 61 arranged at one end of a lever 57 which is pivoted at its other end 59 to the support pedestal 47. A connecting rod 53 is pivoted at one end to the treadle lever 57 and at its other end to the short arm 51 of the bell crank so that by applying pressure downwardly to the treadle 61 the arm 45 of the bell crank is urged toward the forming block 39 to thus clamp the staggered ends of the lamination strips in staggered relationship against the forming block.

After the strips have been staggered and secured by the fastening means 35, the bunch is ready to be arranged to form the rim of a gear blank or the like as shown in Figures 9 and 10 of the drawings which illustrate a gear blank in which the rim portion is formed of three staggered bunches. It will be apparent, however, that the lamination strips may be made in any desired length and that any number of bunches may be used to form a rim. The staggered bunches as they are removed from the fanning device are illustrated in Figure 8 and it will be apparent that these bunches are in condition to be applied immediately to form the rim of the gear blank.

It is thought that the invention and numerous of its attendant advantages will be apparent from the foregoing description, and it will be apparent that numerous changes may be made in the form, construction and arrangement of the various parts without departing from the spirit and scope of the invention or sacrificing any of its material advantages, the form hereinbefore described being a preferred embodiment for purposes of illustration and description.

Having thus described my invention, what I claim as new and desire to secure by Letters Patent is:

1. In a machine for fanning lamination strips, a forming die, means for securing an end of a stack of lamination strips adjacent said forming die, a second clamping means adapted to secure the other end of the stack of strips against the forming die, and a second die arranged adjacent said forming die and adapted to form a stop against which the stack of strips may be positioned when the clamped end thereof is released from said first mentioned clamp.

2. In a machine for fanning lamination strips, a forming die, means for securing an end of a stack of lamination strips adjacent said forming die, a second clamping means adapted to secure the other end of the stack of strips against the forming die, and a second die arranged adjacent said forming die and adapted to form a stop against which the stack of strips may be positioned when the clamped end thereof is released from said first mentioned clamp, said second die being adjustable with respect to the forming die in order to accommodate stacks of strips having varying widths.

In witness whereof, I have hereunto subscribed my name.

LOUIS T. FREDERICK.